Oct. 24, 1972   J. M. PATEL ET AL   3,700,464
DECAFFEINATION PROCESS
Original Filed March 30, 1970
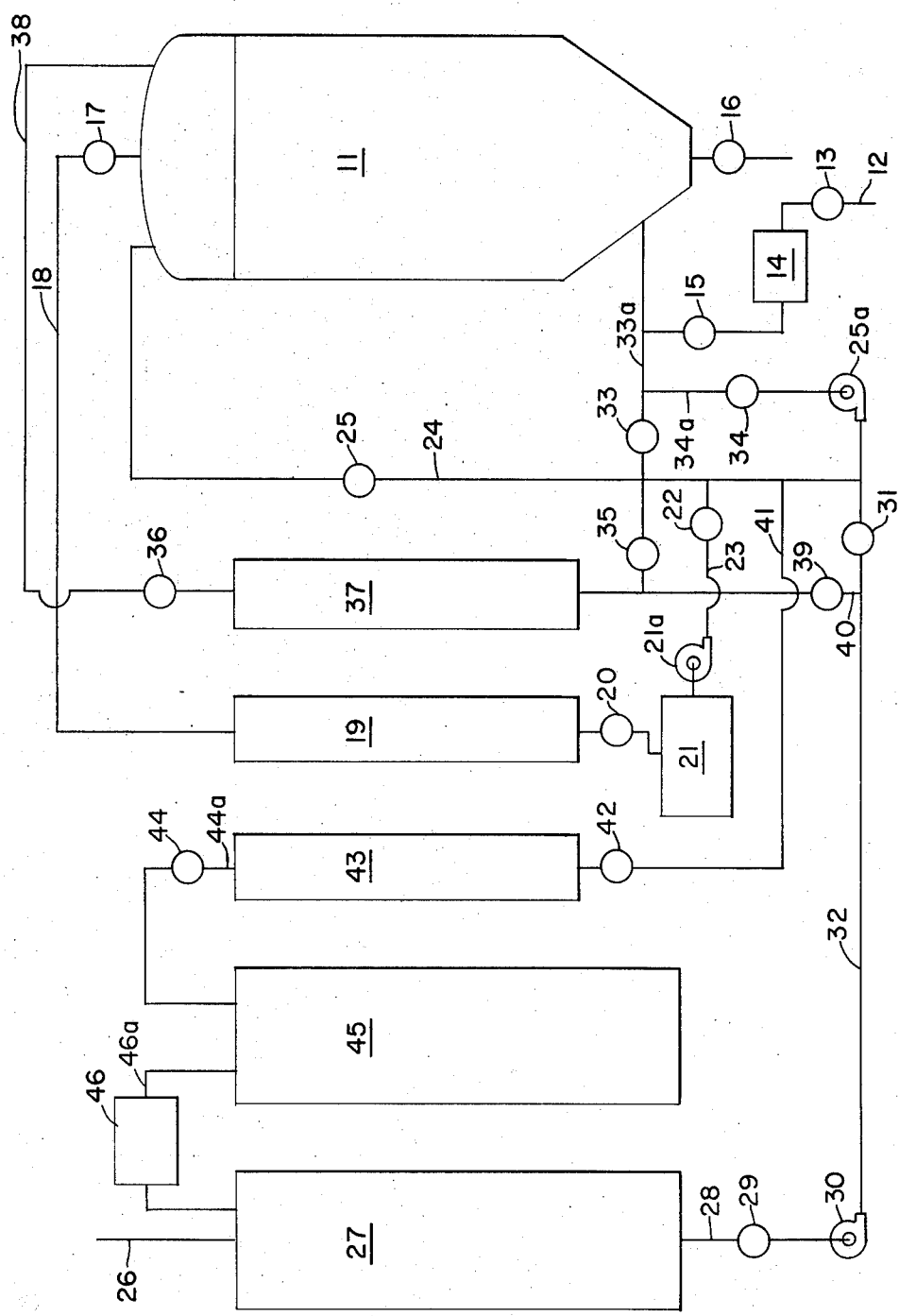
INVENTORS
Jayantilal M. Patel
Alan B. Wolfson
BY Benjamin Lawrence
Edmund H. Sease
ATTORNEY

United States Patent Office 3,700,464
Patented Oct. 24, 1972

3,700,464
DECAFFEINATION PROCESS
Jayantilal M. Patel, Reading and Alan B. Wolfson and Benjamin Lawrence, Springfield Township, Hamilton County, Ohio, assignors to The Procter & Gamble Company, Cincinnati, Ohio
Continuation of abandoned application Ser. No. 23,647, Mar. 30, 1970. This application Feb. 23, 1971, Ser. No. 118,182
Int. Cl. A23f 1/10
U.S. Cl. 99—70
6 Claims

ABSTRACT OF THE DISCLOSURE

Decaffeination total process times and caffeine extraction times are substantially reduced by utilizing high caffeine extracting temperatures and high pre-wetting moisture ranges.

CROSS REFERENCE

This application is a continuation of earlier-filed co-pending application Ser. No. 23,647, filed Mar. 30, 1970 and now abandoned.

BACKGROUND OF THE INVENTION

In recent years the consumer market for decaffeinated coffees has substantially increased. Accordingly, a few commercial manufacturers in the United States are now selling decaffeinated coffee products. One of the major problems involved in preparing a decaffeinated coffee is the rather lengthy process times involved. For example, a typical decaffeination process beginning with green beans and resulting in decaffeinated green beans can and often does take from 31 to 43 hours and from 24 to 36 hours of this total process time is for the caffein extracting step. Because of the lengthy process times involved, decaffeinated products are often substantially higher in cost than non-decaffeinated products.

Decaffeination using green coffee beans as a starting material and providing decaffeinated green coffee beans as the end product, typically involves five basic steps. These steps are steaming, pre-wetting, caffeine extracting, solvent stripping and finally drying and cooling. These five basic steps are nearly as old as decaffeination itself, and according to Sivetz, Coffee Processing Technology, 1963 ed., Avi Publishing Company, vol. 2, p. 207, these five steps have been practiced and well known since at least 1908. For literature disclosing these five basic process steps, see Sivetz, Coffee Processing Technology, vol. 2 p. 207, U.S. Pat. 897,840, U.S. Pat. 936,392, U.S. Pat. 1,502,-222, U.S. Pat. 1,957,358, and U.S. Pat. 1,977,416.

While disclosures relating to each of these basic steps can be found in the above-cited patents, in order to create the proper setting for applicants' invention, a brief description of each of these steps will be given herein.

Steaming.—In the steaming step, dry green coffee beans are steamed until the moisture contents of the beans is increased to within the range of from 16% to about 21%. Steaming times typically range from 1 to about 5 hours. During the steaming operation the cellular structure of the green coffee beans is softened and opened so that caffeine extraction can be more easily accomplished in subsequent steps. For further details relating to the basic steaming operation, see the above-cited Sivetz reference.

Pre-wetting.—During the pre-wetting step, water is added to the previously steamed green beans to increase the total moisture content to within the range of 30% to 40% by weight. The basic purpose of the pre-wetting procedure is to aid in the subsequent extraction of caffeine. For a detailed discussion of pre-wetting conditions, see Berry, U.S. Pat. 2,284,033.

Caffeine extracting.—During extracting, a chlorinated hydrocarbon solvent capable of extracting caffeine is contacted with the previously steamed and pre-wet green coffee beans. Typical chlorinated hydrocarbon solvents often employed are methylene chloride and trichloroethylene. Typically, the solvent and the beans are allowed to maintain contact at a temperature at or near the boiling point of the solvent for a time of from 24 to 36 hours. Of course, during this operation, spent solvent can continuously be replaced with fresh solvent. Alternatively, the same solvent can be utilized for the entire extraction operation. Extracting is continued until qualititative tests on spent solvent show the amount of caffeine contained in the solvent to be at the desired minimum level. For further details relating to solvent etxraction of green coffee beans, see Weimer, U.S. Pat. 1,502,222 and Wilder, U.S. Pat. 1,977,416, and Wolfson et al., a concurrently filed, co-pending, commonly assigned application, Ser. No. 118,183, which relates to decreasing caffeine extracting times by using high solvent velocities and exchange rates.

Solvent stripping.—Solvent stripping is usually accomplished by steam-stripping residual solvent from the decaffeinated green coffee beans which have previously been in contact with the caffeine-extracting solvent. Typically, steam is introduced into the extracting vessel at temperatures of from 212° F. to 240° F. and is continually passed over and through the previously extracted green beans until residual solvent can no longer be detected on the beans. Steam stripping can be conducted for from one up to twenty hours, but more typically is within the range of from one to eight hours. For details relating to the general process of steam stripping, see the above-cited references, and especially the Wilder reference.

Drying and cooling.—Subsequent to steam stripping, the beans are usually dried under vacuum at slightly elevated temperatures for a period of time ranging from four to ten hours. Thereafter the beans are cooled to room temperature and are then ready for subsequent roasting and conversion into a decaffeinated coffee product. For further details relating to the drying and cooling step, see Lawrence et al., a co-pending commonly assigned application Ser. No. 118,185, relating to non-vacuum drying of decaffeinated green coffee beans.

The process of this invention relates to the pre-wetting and extracting steps.

SUMMARY OF THE INVENTION

This invention relates to an improved decaffeination procedure wherein green coffee beans are utilized as a starting material and the end product is decaffeinated green coffee beans. More specifically, the invention relates to an improvement in a decaffeinating process wherein said process involves the steps of steaming green beans, pre-wetting the previously steamed coffee beans, caffeine extracting the previously steam and pre-wet green coffee beans, solvent stripping residual solvent away from the green coffee beans, and drying and cooling the beans to provide decaffeinated green coffee beans, said process improvement relating to the pre-wettting and caffeine extracting steps and comprising: pre-wetting the previously steamed green coffee beans to a moisture content of from 41% to 50% by weight, and preferably from 41% to 45%, and utilizing an extracting temperature of from 120° F. to 250° F., and preferably from 140° F. to 210° F. As a result of the process of this invention, caffeine extracting times are reduced from about 10% to as much as 40% over the prior art.

BRIEF DESCRIPTION OF THE DRAWING

The figure is a flow chart showing one apparatus for practicing the process of this invention.

DETAILED DESCRIPTION OF THE INVENTION

Before describing in detail applicants' process improvements which relates specifically to the caffeine extracting step, a brief description of an overall decaffeination process utilizing the flow chart of the drawing will be given herein. In the following description, unless specified to the contrary, all valves not specifically mentioned as open are closed.

Green coffee beans are charged into extractor 11 through an inlet opening not specifically shown on the drawing. Steam at a temperature of from 212° F. to 240° F. is introduced into the system through steam line 12 and passes through open valve 13 through separator 14 wherein condensate is trapped. Dry steam passes through separator 14 and continues on through open valve 15 into line 33a and passes into the bottom of extractor 11. Steam is then passed in an upward manner through the green coffee beans contained in extractor 11, and passes outward through open valve 17 and into line 18 leading to condenser 19 wherein the steam is condensed. The condensate passes through open valve 20 into separator 21 wherein it is collected and saved for subsequent use in the pre-wetting step, as hereinafter explained. During the steaming step, valve 16 remains partially open so that condensate forming on the beans and dropping to the bottom of the extractor 11 can be removed and saved for use in pre-wetting, if desired.

Preferred steaming temperatures are from 220° F. to 230° F. and it is preferred that steaming continue until the total moisture content of the beans ranges from 16% to 18% and preferably, 17%. Typically, it has been found that the moisture content of the beans is about 17% after steaming for from 15 minutes to one hour, and usually about 30 minutes. This completes the steaming step.

After the above-described steaming procedure, the cellular structure of the green coffee beans is softened and opened so that the caffeine contained in the beans can be more easily extracted during the hereinafter described extracting procedure.

Turning now to the pre-wetting step, wherein water is added to the previously steamed green beans to increase the moisture content to within the broad range of from 30% to 40% and to within the preferred range of from 32% to 38%. These pre-wetting moisture ranges are those known in the prior art and are lower than the pre-wetting moistures which form a part of applicants' improved process.

The moisture addition of the pre-wetting step can be accomplished many different ways. With reference to the drawing pre-wetting water from separator 21 can be added to the top of extractor 11 through centrifugal pump 21a, line 23, open valve 22, line 24 and open valve 25. Or, pre-wetting water may be added to the bottom of extractor 11 through open valve 33 and line 33a.

The amount of pre-wet water required to raise the moisture content of the beans in extractor 11 to the desired level is not sufficient to fill extractor 11, and since the next step in the decaffeination process is to extract with a solvent, all or part of the pre-wetting water may be added at the same time as the solvent. Fresh solvent, which has previously been placed in the fresh solvent storage tank 27 through fresh solvent line 26, drains into line 28, through open valve 29 and is pumped by centrifugal pump 30 through line 32 and open valve 31 into line 24 at the same time pre-wetting water is being pumped into line 24 as described above. The two liquids then pass together into extractor 11 either through line 24 and open valve 25 or through open valve 33 and line 33a or, if desired, simultaneously through both. In summary, there are many options for adding pre-wetting water; it can be added either at the top or bottom of extractor 11, or simultaneously at both top and bottom, and either separately from, together with, or partly separate and partly together with the fresh solvent. During the solvent addition operation valve 17 on line 18 remains open in order to vent air and solvent vapors which may form. Generally, however, the solvent and water, assuming they are added simultaneously through the bottom of extractor 11, are added at ambient conditions. It is preferred that sufficient solvent be added to provide a minimum solvent to bean weight ratio of 3:1, and preferably a ratio within the range of from 3:1 to 8:1, and most preferably a ratio of from 3:1 to 5:1.

After the addition of the solvent and the pre-wetting water as previously described, the pre-wetting step is completed and the caffeine extracting procedure is ready to be accomplished. Caffeine extracting is accomplished utilizing heated solvent at temperatures at or near the solvent boiling point, which for methylene chloride is about 105° F. at atmospheric pressure, and continuously circulating solvent in the manner hereinafter described to provide the maximum contact between solvent and beans. The use of increased solvent temperatures substantially higher than the solvent boiling point to provide substantially reduced extracting times is also a part of applicants' improved process and will be explained in detail hereinafter.

Prior to any solvent circulation through the entire system, the solvent contained in extractor 11 is heated by continuously circulating through heat exchanger 37 and into extractor 11 as follows: Valve 34 is opened and extracting solvent contained in extractor 11 drains into lines 33a, 34a and pump 25a wherein it is pumped into line 24 and through open valve 35 into heat exchanger 37 wherein the extracting solvent is heated to extracting temperatures as explained hereinafter, and then passes through open valve 36 on line 38 and passes back into the top of extractor 11. The circulatory pumping of extracting solvent through heat exchanger 37 and into line 38 and into the top of extractor 11 and out of the bottom of extractor 11 and back into heat exchanger 37 is continued until the extracting solvent has reached the desired temperature within the hereinafter described range. Usually it is preferred that heating be conducted for from 15 minutes to one hour, and preferably, for from 20 minutes to 40 minutes. After circulatory pumping and heating for times within the preferred time ranges, it has been found that the solvent has usually been increased to the required caffeine extracting temperature. After heating, the solvent is ready to begin continuous circulation for the required caffeine extracting time which usually ranges from 24 to 36 hours. During the extracting time fresh solvent is continuously fed into extractor 11 and spent solvent is continuously bled off from extractor 11 while simultaneously a recirculation of solvent is conducted. More specifically, with reference to the drawing, fresh solvent from solvent tank 27 passes into line 28 through open valve 29 and is pumped by pump 30 into line 32, and because valve 31 is closed, passes into line 40 and through open valve 39 on line 40 into heat exchanger 37, wherein the temperature is raised to the required extracting temperature. Thereafter the solvent passes into line 38 through open valve 36 and back down into the top of extractor 11.

Simultaneously with the fresh input of solvent through line 38, spent solvent is removed from the bottom of extractor through lines 33a, 34a and open valve 34, and passes through pump 25a into line 24. Because valve 25 on line 24 is partially closed, a portion of the solvent passes into line 41 through open valve 42 and into heat exchanger 43 wherein it is cooled and passes on into line 44a through open valve 44 and into spent solvent storage tank 45. Spent solvent storage tank 45 can be a distilling apparatus, in which case the spent solvent can continuously be distilled and passed into line 46a and through condenser 46 and back into fresh solvent tank 27. As previously mentioned, when withdrawing spent solvent from the bottom of extractor 11 through lines 33a, 34a and open valve 34, as well as through pump 25a which pumps solvent into line 24, a portion of the spent solvent passes into line 41; however, because valve 25 on line 24 is only partially closed, a portion of the sovlent is recirculated back into the top of extractor 11 through line 24. Recirculation, as just explained, controls the solvent superficial velocity. The solvent exchange rate is controlled by controlling the rate of fresh solvent input and the rate of spent solvent withdrawal. The solvent superficial velocity and the exchange rate will be defined hereinafter.

After caffeine extracting for the required period of time, solvent is drained from extractor 11 and the now extracted green coffee beans are ready for stripping of residual solvent and subsequent drying and cooling.

Solvent stripping is conducted while the beans are still in extractor 11 and is conducted in the same manner as the steaming operation previously described with reference to the first step in the five basic steps of decaffeination. Solvent stripping is continued by steaming in the manner previously described for from one to eight hours, and most preferably, one to two hours.

After solvent stripping by steaming, the beans are discharged from extractor 11 through a discharge line (not depicted in the drawing), and are subsequently dried and cooled and ready for use in preparing a decaffeinated coffee product. Just prior to drying, the moisture content of the beans ranges from about 45% to about 55%. Conventionally, the beans are dried by a method such as vacuum drying at temperatures of from 120° to 240° F. for a period of time ranging from 4 to 10 hours. When vacuum drying is employed, a typical vacuum pressure is from 20 to 27 inches of mercury. Subsequently the beans are cooled by convection methods usually, and the decaffeinated green beans are then ready for subsequent roasting and conversion into a decaffeinated coffee product.

Roasting and grinding to provide a roast and ground decaffeinated coffee product can be done in conventional manners such as those described in Sivetz, Vol. I, Chapter 8. Alternatively, the roast and ground coffee can be utilized to prepare an instant coffee product by preparing an extract therefrom and subsequently drying the extract in manners taught in Sivetz, Vol. I, Chapters 9, 10, and 13.

Turning now to the pre-wetting step wherein as previously mentioned one portion of applicants' invention is practiced.

Again, as previously mentioned, typical caffeine extracting times when utilizing a method such as that described herein, generally range from 24 to 36 hours. It has been surprisingly and unexpectedly discovered that when the pre-wetting moisture content of the previously steamed green coffee beans is increased prior to caffeine extracting, to within the range of 41% to 50% and preferably to within the range of 41% to 45% by weight, caffeine extracting times can be significantly reduced and the high grown flavor of the coffee beans can be increased.

As previously indicated, the prior art shows pre-wetting total moisture contents within the range of from 30% to 40% by weight. Heretofore it was thought that using higher moisture contents would give no advantages and in fact would be disadvantageous in that longer drying times would be necessitated in subsequent steps which would only increase cost of operation.

All other variables remaining constant at levels set forth hereinafter, an increase in pre-wetting moisture of from 37% by weight, which is within the range taught in the prior art, to 42% which is within applicants' claimed range will provide a decrease in caffeine extracting time of 2.5 hours (from 23 hours down to 20.5 hours), and provide a significant increase in high grown coffee flavors which are very desirable to increase. The extracting times given herein are with reference to obtaining 97% caffeine-free beans. 97% caffeine-free is an industry-recognized standard.

While not wishing to be bound by any theory, it is believed that increased pre-wetting moistures above those taught by the prior art, decrease caffeine extracting times because caffeine extracting is a mixed diffusion process rather than a single diffusion of caffeine from the bean to the extracting solvent. It is believed that the caffeine contained in the green coffee beans diffuses out of the bean cells and into the pre-wetting water which is absorbed by the beans. When the previously pre-wet beans are contacted with extracting solvent, the caffeine diffuses from the water contained in the beans into the extracting solvent. Diffusion of the caffeine from bean-absorbed water into the solvent is easier and quicker than diffusion from the bean directly to the solvent, and therefore having a maximum amount of green bean water saturation reduces extracting time.

With regard to the increased high grown flavor produced by using increased pre-wetting moistures, no explanation is known for this totally unexpected but very beneficial result. Taste testing by expert flavor panels has shown that increasing pre-wetting moisture from below 30% incrementally up to 40% has a negative effect on high grown coffee flavors, that is, high grown flavors are markedly decreased. However, as soon as the percent of pre-wetting moisture increases above 40% and especially above 41% a marked increase in high grown flavor occurs. For example, increasing the pre-wetting moisture content from 32% to 40% decreases an expert panel flavor score from 7.5, which is good, to about 4.5 which is poor. A further increase in pre-wetting moisture from 40% to 42%, again all other process conditions remaining constant, provides an increase in expert panel flavor score of up to 7.0 which is an increase of 2.5 units and regarded as significant.

The flavor scale used by the expert panel used 10.0 as the best score and represented the best high grown flavor. A grade of zero would represent total absence of high grown flavor. In each instance the cups of coffee tasted by the expert panel were prepared by adding 7.2 grams of decaffeinated coffee to 178 milliliters of water/cup of desired beverage and the coffee was perked for 12 minutes until the water reached 180° F.

In providing the above comparative tests, it has been mentioned several times that all conditions remained constant except for pre-wet moistures which were varied. More specifically, the other conditions were as indicated in the following table:

Steaming:
    Temperature—235° F.
    Time—0.5 hour
    Moisture content—17%
Pre-wetting: Total moisture content—varied
Extracting: (methylene chloride solvent)
    Temperature—105° F.
    Superficial solvent velocity—.09 ft./minute [1]
    Solvent exchange rate [2]—1 pound/pound of coffee/hour
Solvent stripping:
    Temperature—210 F.–220° F.
    Time—1.5 hours
Drying and cooling:
    Drying in a roaster at 250° F.
    Cooling—ambient conditions

[1] "Superficial solvent velocity" refers to a measure of the velocity of the solvent past the beans contained in the extractor.
[2] "Solvent exchange rate" refers to the amount of solvent exposed to a given amount of beans in a specific unit of time. For further details relating to both solvent velocity and solvent exchange rate, see the previously cited co-pending Wolfson et al. application.

The apparatus shown in the drawing was used to make each of the runs.

Turning now to increased extracting temperatures which forms a second portion of applicants' invention, previously it had been thought that using temperatures much above the boiling point of the caffeine extracting solvent would provide no advantages and in fact may cause flavor degradation and pressure problems. However, using temperatures within applicants' range of 120° F. to 250° F. and within the preferred range of 140° F. to 210° F. provides significant decreases in extracting times. For example, using the conditions previously indicated in the table and a constant pre-wetting moisture of 37% with an extracting temperature of 105° F., provides a caffeine extracting time of 23 hours for 97% caffein-free beans, whereas using a temperature of 150° F. provides a caffeine extracting time of 15.6 hours, which is a percentage decrease in extracting time of about 32%.

Of course, as the temperatures used increase above the boiling point of the extracting solvent, increased pressure must be used to keep the solvent from vaporizing. While the exact pressure employed is really a function of the temperature used and the vapor pressure of the solvent, it has been found that pressures within the range of 30 p.s.i.g. to 200 p.s.i.g. are satisfactory for temperatures of from 120° F. to 250° F. and preferably 50 p.s.i.g. to 80 p.s.i.g. for temperatures within the preferred range of 140° F. to 210° F. In the above comparative test the pressure employed was 50 p.s.i.g.

The above description has been given with specific reference to the flow chart shown in the drawing; however, it is to be understood that other processes different from the batch process disclosed in the drawing, can be utilized along with applicants' invention. In summary, the process need not be a batch process and can be semi-continuous such as a countercurrent process. For a detailed description of a countercurrent decaffeination process, see copending commonly assigned and concurrently filed herewith case: Ser. No. 118,184, Patel et al., entitled "Semi-Continuous Countercurrent Decaffeination Process."

The following example is offered to illustrate the process of this invention.

Example 250 pounds of green coffee beans (225 pounds in a dry weight basis) comprising a blend consisting of Arabicas and Robustas is charged into extractor 11 through an inlet opening, not depicted on the drawing. Steam at a temperature of 230° F. is introduced into the system through steam line 12, passes through open valve 13, through separator 14 wherein condensate is trapped and the dry steam is passed therethrough and continues through open valve 15 and into the bottom of extractor 11. Steam is continually passed in an upward manner through the green coffee beans contained in extractor 11 for 0.5 hour. After passing through the green coffee beans, the steam passes out of extractor 11 through open valve 17 and into line 18 leading to condenser 19, wherein the steam is condensed. The condensate passes through open valve 20 and is collected in separator 21. During the steaming operation valve 16 remains partially open so that condensate forming on the green beans can be removed through valve 16. The total moisture content of the green beans after steaming at 230° F. for 0.5 hour is 17%. This completes the steaming step.

Turning now to the pre-wetting step, wherein the moisture content of the beans is adjusted to 42%. It was calculated that the required amount of water necessary to provide a moisture content of 42% by weight was 117 pounds.

The required pre-wetting water and methylene chloride solvent are added simultaneously in the following manner. Fresh methylene chloride solvent from fresh solvent tank 27 drains into line 28 through open valve 29 and is pumped by centrifugal pump 30 through open valve 31 on line 32 and into line 24. Because valve 25 is closed and valve 33 open, the fresh solvent passes through valve 33 and line 33a into the bottom of extractor 11. Simultaneously with the solvent addition just described, the pre-wetting water is added through separator 21, pump 21a into line 23, through open valve 22 on line 23, and in the same manner as the solvent through open valve 33 and line 33a into the bottom of extractor 11. The balance of the pre-wetting water is fresh water which is added through the separator for convenience. During this solvent and water addition, valve 17 on line 18 remains open in order to vent steam pressure which builds up. The solvent and pre-wetting water are added at ambient conditions. The flow rate of fresh solvent and pre-wetting water into extractor 11 is 2.5 gallons/minute. The total amount of solvent used in filling extractor 11 is 1000 pounds. The ratio of solvent to beans is 4:1. This completes the pre-wetting step.

The methylene chloride solvent contained in extractor 11 is heated by continuously circulating through heat exchanger 37 (wherein it is adjusted to a temperature of 150° F.) and through extractor 11. Circulation is accomplished by opening valve 34 and allowing methylene chloride solvent contained in extractor 11 to drain into centrifugal pump 25a wherein it is pumped at a rate of 8.5 gallons/minute into line 24, through open valve 35 and into heat exchanger 37 wherein the methylene chloride is heated to a temperature of 150° F. Thereafter the methylene chloride solvent passes through open valve 36 and into line 38 and back into the top of extractor 11. Circulatory pumping of extracting solvent through heat exchanger 37 and into the top of extractor 11 and out of the bottom of extractor 11 and back into heat exchanger 37 is continued for 40 minutes until the solvent and bean temperatures are both 150° F. The pressure within the system is 80 p.s.i.g. After completing this initial heating step, fresh solvent is continuously circulated into extractor 11 and spent solvent is continuously bled off from extractor 11 at an exchange rate of 1 pound of solvent/pound of coffee/hour. Simultaneously, a small recirculation of spent solvent through line 24 and back into the top of extractor 11 is conducted such that the solvent superficial velocity is 0.09 ft./minute.

With reference to the drawing, the solvent exchange rate and the solvent velocity are controlled in the following manner: Fresh solvent from tank 27 passes into line 28 through open valve 29 and is pumped by pump 30 at a rate of 2.25 gallons/minute into line 32 and because valve 31 is closed, passes into line 40 through open valve 39 and into heat exchanger 37 wherein the temperature is adjusted to 150° F. the required extracting temperature. Thereafter the solvent passes into line 38 through open valve 36 and back into the top of extractor 11. Simultaneously with the fresh input of methylene chloride solvent through line 38, spent solvent is removed from the bottom of extractor 11 through open valve 34 at a rate of 8.5 gallons/minute and passes through pump 25a into line 24. Valve 25 on line 24 is partially closed, and therefore 25.5% of the spent solvent passes into line 41 through open valve 42 and into heat exchanger 43 wherein it is cooled and passes on into line 44a through open valve 44, and into spent solvent storage tank 45. In tank 45 the solvent is distilled at 105° F. and passes into line 46a, through condenser 46 and back into fresh solvent tank 27. A majority portion (74.5%) of spent solvent passes through valve 25a on line 24 and is recirculated back into the top of extractor 11 at a solvent velocity of 0.09 ft./minute. After extracting for 12 hours at a temperature of 150° F. the extracting step is completed.

Thereafter, solvent stripping is conducted at temperatures within the range of 220° F.–230° F. for a time of 1.5 hours in the exact manner previously described in connection with the steaming step.

Thereafter, the beans are discharged from extractor 11 through a discharge line, not depicted in the drawing, and subsequently vacuum dried at a temperature of 150° F. for a period of time of 3.5 hours. The vacuum drying pressure is 20 inches of mercury. Subsequently the beans are cooled by exposure to ambient condition air currents and utilized to prepare a roast and ground decaffeinated coffee product in the following manner. The total 250 pounds of decaffeinated blended green coffee beans are roasted in a Jubilee roaster at an air temperature maintained within the range of 400° F. to 440° F. The end roast temperature was 440° F. and the total roast time was 12 minutes. The roasted beans are quenched with 5 gallons of water.

Thereafter the blended roasted decaffeinated coffee beans were ground to regular grind size in a Gump grinder.

A panel of four expert tasters prepares cups of coffee from the roast and ground decaffeinated product by placing 7.2 grams per cup of desired beverage along with 178 ml. of water per cup of desired beverage in a conventional percolator, and allowing it to perk until the temperature reached 180° F., at which time the coffee beverage is poured into cups to be tasted by the expert panel.

In comparing the decaffeinated product of this invention with the decaffeinated product previously described in the specification and prepared using a pre-wetting moisture of 37% and other conditions as shown in the table, it is noted that the panel characterized the flavor of the product utilizing applicants' pre-wetting moisture of 42% as significantly increased in high grown flavor.

What is claimed is:

1. In a decaffeinating process, wherein said process involves the steps of steaming green coffee beans, pre-wetting the previously steamed green coffee beans, extracting caffeine from the previously steamed and pre-wetted green coffee beans with a caffeine extracting solvent, solvent stripping residual solvent away from said beans, and drying and cooling the beans to provide decaffeinated green coffee beans, the improvement relating to the pre-wetting step which comprises pre-wetting the previously steamd green coffee beans to a total moisture content of from 41% to 50% by weight.

2. The process of claim 1 wherein the pre-wetting moisture range is from 41% to 45%.

3. The process of claim 1 wherein extracting is conducted at a temperature of 120° F. to 250° F.

4. The process of claim 3 wherein during the extracting step a pressure of from 30 p.s.i.g. to 200 p.s.i.g. is utilized.

5. The process of claim 1 wherein the extracting temperatures are from 140° F. to 210° F.

6. The process of claim 5 wherein the extracting pressure utilized is from 50 p.s.i.g. to 80 p.s.i.g.

References Cited

UNITED STATES PATENTS

| | | | |
|---|---|---|---|
| 2,284,033 | 5/1942 | Berry | 99—69 |
| 2,309,092 | 1/1943 | Berry et al. | 99—70 |
| 1,977,416 | 10/1934 | Wilder | 99—70 |
| 2,309,139 | 1/1943 | Rector | 99—70 |
| 2,933,395 | 4/1960 | Adler et al. | 99—69 X |

OTHER REFERENCES

Sivetz, Coffee Processing Technology, vol. 11, 1963, p. 207.

FRANK W. LUTTER, Primary Examiner

W. L. MENTLIK, Assistant Examiner